US012024438B2

(12) United States Patent
Bauer et al.

(10) Patent No.: US 12,024,438 B2
(45) Date of Patent: Jul. 2, 2024

(54) IRON-LOADED SMALL PORE ALUMINOSILICATE ZEOLITES AND METHOD OF MAKING METAL LOADED SMALL PORE ALUMINOSILICATE ZEOLITES

(71) Applicants: Johnson Matthey Catalysts (Germany) GmbH, Redwitz an der Rodach (DE); JOHNSON MATTHEY PUBLIC LIMITED COMPANY, London (GB)

(72) Inventors: Juergen Bauer, Redwitz an der Rodach (DE); John Leonello Casci, Billingham Cleveland (GB); Ralf Dotzel, Redwitz an der Rodach (DE); Joerg Muench, Redwitz an der Rodach (DE); Ralitsa Purova, Erlangen (DE); Wilhelm Schwieger, Erlangen (DE); Ameen Shahid, Erlangen (DE); Selvam Thangaraj, Erlangen (DE); Tobias Weissenberger, Erlangen (DE)

(73) Assignees: Johnson Matthey Public Limited Company, London (GB); Johnson Matthey Catalysts (Germany) GmbH, Redwitz (DE)

( * ) Notice: Subject to any disclaimer, the term of this patent is extended or adjusted under 35 U.S.C. 154(b) by 52 days.

(21) Appl. No.: 17/661,353

(22) Filed: Apr. 29, 2022

(65) Prior Publication Data

US 2022/0250928 A1 Aug. 11, 2022

Related U.S. Application Data

(62) Division of application No. 16/739,615, filed on Jan. 10, 2020, now Pat. No. 11,634,335.

(30) Foreign Application Priority Data

Jan. 14, 2019 (GB) .................................... 1900484

(51) Int. Cl.
| | | |
|---|---|---|
| *B01J 37/02* | (2006.01) | |
| *B01J 29/04* | (2006.01) | |
| *B01J 29/072* | (2006.01) | |
| *B01J 29/72* | (2006.01) | |
| *B01J 29/74* | (2006.01) | |
| *B01J 29/76* | (2006.01) | |

(Continued)

(52) U.S. Cl.
CPC ............. *C01B 39/48* (2013.01); *B01J 29/041* (2013.01); *B01J 29/043* (2013.01); *B01J 29/072* (2013.01); *B01J 29/7207* (2013.01); *B01J 29/723* (2013.01); *B01J 29/7407* (2013.01); *B01J 29/743* (2013.01); *B01J 29/7607* (2013.01); *B01J 29/763* (2013.01); *B01J 29/7807* (2013.01); *B01J 29/783* (2013.01); *B01J 35/0006* (2013.01); *B01J 35/04* (2013.01); *B01J 35/1038* (2013.01); *B01J 35/1042* (2013.01); *B01J 35/1047* (2013.01); *B01J 35/1057* (2013.01); *B01J 35/1061* (2013.01); *B01J 35/109* (2013.01); *B01J 37/0018* (2013.01);

(Continued)

(58) Field of Classification Search
CPC ...... B01J 29/044; B01J 29/041; B01J 29/043; B01J 29/072; B01J 29/7207; B01J 29/723; B01J 29/7407; B01J 29/743; B01J 29/7607; B01J 29/763; B01J 29/7807; B01J 29/783; B01J 2229/186; B01J 2229/34; B01J 2229/36; B01J 2229/38; B01J 2229/22; B01J 35/04; B01J 35/0006; B01J 35/1038; B01J 35/1042; B01J 35/1047; B01J 35/1057; B01J 35/1061; B01J 35/109; B01J 37/0203; B01J 37/0018; B01J 37/0201; B01J 37/0215; B01J 37/10; C01B 39/48; C01B 39/026; C01B 39/04; C01B 39/14; C01B 39/142; C01B 39/145; F01N 3/2842; F01N 3/2066; B01D 2255/1021; B01D 2255/1023; B01D 2255/2065; B01D 2255/2073; B01D 2255/20761; B01D 2255/20738; B01D 2255/50; B01D 2251/2062; B01D 53/9418; C01P 2002/86; C01P 2002/72; C01P 2002/84; C01P 2004/03; C01P 2006/12; C01P 2006/14; C01P 2006/16
USPC .......... 502/60, 73, 74, 85, 86; 423/700, 701, 423/702, 704, 718

See application file for complete search history.

(56) References Cited

U.S. PATENT DOCUMENTS

| | | | |
|---|---|---|---|
| 8,603,432 | B2 | 12/2013 | Andersen et al. |
| 9,011,807 | B2 | 4/2015 | Mohanan et al. |

(Continued)

FOREIGN PATENT DOCUMENTS

| | | |
|---|---|---|
| CN | 105457674 A | 4/2016 |
| GB | 2527398 A | 12/2015 |

(Continued)

OTHER PUBLICATIONS

Gao, et al., "Hydrothermal Aging Effects on Fe/SSZ-13 and Fe/Beta NH3-SCR Catalysts", Topics in Catalysis, vol. 59, pp. 882-886, 2016.

(Continued)

*Primary Examiner* — Elizabeth D Wood (57) ABSTRACT

The present invention further provides a method of making an metal-loaded aluminosilicate zeolite having a maximum pore opening defined by eight tetrahedral atoms from pre-existing aluminosilicate zeolite crystallites, wherein the metal is present in a range of from 0.5 to 5.0 wt. % based on the total weight of the metal-loaded aluminosilicate zeolite.

15 Claims, 3 Drawing Sheets

(51) Int. Cl.
| | |
|---|---|
| *B01J 29/78* | (2006.01) |
| *B01J 35/00* | (2006.01) |
| *B01J 35/04* | (2006.01) |
| *B01J 35/10* | (2006.01) |
| *B01J 37/00* | (2006.01) |
| *B01J 37/10* | (2006.01) |
| *C01B 39/02* | (2006.01) |
| *C01B 39/04* | (2006.01) |
| *C01B 39/14* | (2006.01) |
| *C01B 39/48* | (2006.01) |
| *F01N 3/20* | (2006.01) |
| *F01N 3/28* | (2006.01) |

(52) U.S. Cl.
CPC ....... *B01J 37/0201* (2013.01); *B01J 37/0207* (2013.01); *B01J 37/0215* (2013.01); *B01J 37/10* (2013.01); *C01B 39/026* (2013.01); *C01B 39/04* (2013.01); *C01B 39/14* (2013.01); *C01B 39/145* (2013.01); *F01N 3/2066* (2013.01); *F01N 3/2842* (2013.01); *B01D 2255/1021* (2013.01); *B01D 2255/1023* (2013.01); *B01D 2255/2065* (2013.01); *B01D 2255/2073* (2013.01); *B01D 2255/20761* (2013.01); *B01J 2229/186* (2013.01); *B01J 2229/22* (2013.01); *B01J 2229/34* (2013.01); *B01J 2229/36* (2013.01); *B01J 2229/38* (2013.01); *C01P 2002/84* (2013.01); *C01P 2004/03* (2013.01); *C01P 2006/12* (2013.01); *C01P 2006/14* (2013.01); *C01P 2006/16* (2013.01)

(56) References Cited

U.S. PATENT DOCUMENTS 11,007,512 B1 * 5/2021 Ding .................... B01J 37/0018
11,161,101 B2 * 11/2021 Kato ..................... B01J 23/464

FOREIGN PATENT DOCUMENTS

| JP | 2010-524677 A | 7/2010 |
|---|---|---|
| JP | 2015-533342 A | 11/2015 |

OTHER PUBLICATIONS

Gao, et al., "Iron loading effects in Fe/SSZ-13 NH3-SCR catalysts: nature of the Fe-ions and structure-function relationships", ACS Catalysis, 6(5), pp. 2939-2954, 2016.

* cited by examiner

IRON-LOADED SMALL PORE ALUMINOSILICATE ZEOLITES AND METHOD OF MAKING METAL LOADED SMALL PORE ALUMINOSILICATE ZEOLITES

The present invention relates to an iron-loaded aluminosilicate zeolite having a maximum pore opening defined by eight tetrahedral atoms—defined herein as being "small pore"—and having the framework type CHA, AEI, AFX, ERI or LTA, and wherein the iron (Fe) is present in a range of from about 0.5 to about 5.0 wt. % based on the total weight of the iron-loaded aluminosilicate zeolite. The invention also relates to a method of making metal-loaded small pore aluminosilicate zeolites.

In this specification, zeolites are defined as crystalline inorganic microporous materials comprised of $SiO_4$ and $AlO_4$ tetrahedra, i.e. aluminosilicates, which are linked through corner-sharing oxygen atoms, and are widely used in separation and catalysis because of their high surface area, uniform channels, acidity, ion exchange ability and high hydrothermal stability.

Certain metal loaded zeolites, for example, iron-(Fe) loaded zeolites, demonstrate relatively high catalytic activity in several reactions such as direct $N_2O$ decomposition, direct oxidation of benzene to phenol and selective catalytic reduction of nitric oxide and/or nitrogen dioxide by ammonia ($NH_3$-SCR) and have been extensively investigated.

The selective catalytic reduction of nitrogen oxides ($NO_x$) by ammonia ($NH_3$-SCR) is considered to be the most practical and efficient technology for the abatement of $NO_x$ from exhaust gases emitted from the stationary sources and mobile engines, principally diesel engines, for vehicles such as automobiles, trucks, locomotives and ships. The nature and distribution of iron species in Fe-loaded zeolites largely depend on the catalyst preparation method, which thus determines the Fe-loaded zeolite's resulting catalytic activity. Several methods have been mentioned in the literature for preparing Fe-loaded zeolites, including wet impregnation, wet ion exchange, solid state ion exchange, chemical vapour deposition and direct synthesis procedures.

The direct synthesis of iron-loaded zeolites is a complicated process and depends on the synthesis conditions (see M. Moliner, ISRN Materials Science, 2012, Article ID 789525). Another alternative is to use a commercial zeolite support and subsequently to add iron by post-synthesis treatment of the zeolite either by wet impregnation, wet ion exchange or solid-state ion exchange.

The present invention relates to the introduction of metal, in particular iron, into pre-existing synthetic or natural zeolites, i.e. the invention does not relate to the direct synthesis of metal-loaded zeolites. A problem associated with the preparation of Fe-loaded synthetic zeolites by post-synthesis treatment is the aggregation of iron species, which leads to a heterogeneous distribution of iron species in the zeolite ZSM-5 (MFI) (see e.g. L. Kustov et al., Topics in Catalysis, 238 (2006) pp. 250-259).

According to IUPAC, there are three different porosity levels: these comprise micropores (pore diameter dP up to 2 nm), mesopores (dP from 2 to 50 nm) and macropores (dP greater than 50 nm) [Haber et al. IUPAC, Pure and Appl. Chem., 63 (1991) 1227].

Hierarchical zeolites can have either micropores and mesopores, micropores and macropores or all three porosity levels [Chen et al. J. Mater. Chem., 22 (2012) 17381], with the decisive criterion for hierarchy being the crosslinking between the various porosity levels. It is known to synthesise micro-mesoporous hierarchically structured zeolitic materials, which integrate at least two levels of porosity, using e.g. organic molecules such as polymers and surfactants as mesopore templates in addition to regular micropore templates. Macropores can be introduced into zeolites through sphere templating, post-synthetic modifications, and templating with macroporous supports. A technique of making microporous-macroporous zeolite MFI is disclosed in A. G. Machoke et al, Adv. Mater. 2015, 27, 1066-1070.

Zeolites can also be categorised by pore size, e.g. a maximum number of tetrahedral atoms present in a zeolite's framework. As defined herein, a "small pore" zeolite, such as CHA, contains a maximum ring size of eight tetrahedral atoms, whereas a "medium pore" zeolite, e.g. MFI, contains a maximum ring size of ten tetrahedral atoms; and a "large pore" zeolite, such as BEA, contains a maximum ring size of twelve tetrahedral atoms. "Meso pore" zeolites are also known, but they have a maximum ring size of greater than twelve tetrahedral atoms. Meso pore zeolites are not the same as small-, medium- or large-pore zeolites that have had mesoporosity introduced into a crystallite structure thereof by a post-synthesis treatment applied to the underlying zeolite. This is because meso-pore zeolites have a maximum ring size of greater than twelve tetrahedral atoms, whereas the zeolitic framework of the underlying zeolite into which mesoporosity has been introduced, e.g. a small pore zeolite, still has a maximum ring size of eight tetrahedral atoms.

It is known that relatively good low temperature (200-450° C.) $NH_3$-SCR catalytic activity can be obtained from Cu-SSZ-13 (CHA) zeolites (see e.g. International patent publication no. WO2008/132452 A2). However, in general, Fe-loaded zeolites exhibit relatively higher temperature catalytic activity than Cu-containing zeolites and so Fe-loaded zeolites are of particular interest for $NH_3$-SCR applications. Moreover Cu-containing zeolites can lead to formation of $N_2O$ at higher reaction temperatures.

There have been several recent attempts to make Fe-loaded CHA zeolites. WO 2008/132452 A2 disclosed a process of preparing a 3 wt % Fe-SSZ-13 sample from a commercially available sample of SSZ-13 by firstly ion-exchanging in a solution of $NH_4NO_3$ to produce a $NH_4^+$ SSZ-13, which was filtered and then added to an aqueous solution of $Fe(NO_3)_3$ with stirring. The slurry was filtered, then washed and dried and the final product was calcined to produce a so-called "fresh" product. The fresh 3 wt % Fe-SSZ-13 was severely lean hydrothermally aged at 900° C. for 1 hour in 4.5% $H_2O$/air mixture and the resulting aged product was tested for $NH_3$-SCR activity according to Example 6. The results for $NO_x$ conversion at 350° C. and 450° C. are discussed at Example 14 and shown in FIG. 19. The fresh, i.e. un-aged, 3 wt % Fe-SSZ-13 was also tested for $NH_3$-SCR activity at 300° C. and 350° C. according to Example 22 in a synthetic gas composition wherein a $NO_x$ component consisted of NO only or a 1:1 mixture of both NO and $NO_2$. The results are shown in FIG. 20.

WO 2008/118434 A1 discloses at Example 3 and Table 1 a so-called high-silica chabazite (CHA) synthesised according to examples in U.S. Pat. No. 4,544,538 and having a silica-to-alumina ratio of 28. Table 1 discloses that the CHA material of Example 3 was Fe ion-exchanged with 1.4 wt % $Fe_2O_3$ but there is no explanation of the methodology used.

Similarly, US patent publication 2018/0237307 discloses a chabazite-type zeolite and a method of making it, to which iron may be introduced by post-synthesis addition. However, none of the Examples explains how the iron was added.

However, in general, the small pores of the CHA zeolite tend to impede ion-exchange of the iron species into the zeolite framework resulting in partial exchange of the iron ions to the Brönsted sites and potentially the formation of larger iron oxide particles.

For example, R. Q. Long et al., J. Cat. 207, 274-285 (2002) discloses the preparation of Fe-(natural)CHA for selective catalytic reduction of NO with ammonia. The natural CHA used had a Si/Al ratio of 2, i.e. a silica-to-alumina ratio of 4. The natural CHA was first transformed to $NH_4$-zeolite by exchanging with 0.5M $NH_4Cl$ solution (4 times) at room temperature. A conventional ion-exchange procedure was used to prepare the ion-exchanged product wherein 2 g of the $NH_4$-zeolite was added to 200 ml of 0.05M $FeCl_2$ solution with constant stirring for 24 hours followed by washing five times with deionized water. The obtained catalyst was first dried at 120° C. in air for 12 hours, then calcined at 500° C. for 6 hours. The resulting catalyst was said to have an ion-exchange level of 56%. However, the catalytic activity measured in a fixed-bed quartz reactor using a synthetic flue gas of 1000 ppm NO, 1000 ppm $NH_3$, 2% $O_2$ and balance He was relatively poor compared with Fe-(synthetic) mordenite (MOR), Fe-beta (BEA), Fe-ferrierite (FER) and Fe-(natural) clinoptilolite (HEU).

The results published in R. Q. Long et al., J. Cat. 207, 274-285 (2002) were discussed in WO 2008/132452 A2, wherein it was suggested that the relatively poor performance was due to two principle reasons. Firstly, natural chabazite can contain basic metal cations including potassium, sodium, strontium and calcium. To obtain an active material, the basic metal cations need to be exchanged for, e.g. iron cations because basic metals are a known poison of zeolite acid sites. In the reported study the natural mineral was first treated with $NH_4Cl$ solution in an attempt to "flush out" the existing cations. However, the acidic sites in the chabazite of this study may have remained poisoned by basic metal cations.

Secondly, WO 2008/132452 A2 speculates that because iron ions can form metal complexes (coordination compounds) with suitable ligands in the ionic exchange medium and the zeolite pores are relatively small, it is possible that a bulky co-ordination compound comprising $FeCl_2$ may not be able to gain access to the active sites located in the pores.

US patent publication no. 2012/0208692 discloses a process for producing an SCR-active zeolite catalyst, wherein an Fe ion-exchanged zeolite is first calcined in a reducing hydrocarbon atmosphere at 300° C. and 600° C. to reduce the oxidation state of the Fe ions and/or increase the dispersity of the Fe ions on the zeolite, and then the reduced zeolite is calcined in an oxidizing atmosphere in a second thermal treatment at 300° C. and 600° C. to oxidatively remove hydrocarbon and/or carbon residues. The disclosure mentions that the zeolites can be zeolite beta (BEA), ZSM-5 (MFI), faujasite, ferrierite, Y, ZSM-20, MCM-41, chabazite or SAPO, but preferably MFI, which is exemplified, or zeolite beta. According to the disclosure, the resulting catalysts are pale yellow to beige in colour, which is said to be indicative of an iron oxidation state below $Fe^{3+}$, i.e. $Fe^{2+}$, whereas a rust-red colour would indicate $Fe^{3+}$.

More recently, it has been shown that an adapted wet ion exchange of microporous SSZ-13 (CHA) zeolite with $FeSO_4 \cdot 7H_2O$, using nitrogen to protect the sample preparation, can be used to prepare Fe-SSZ-13 zeolite (see F. Gao et al., ACS Catal. 2016, 6, 2939-2954) resulting—it is claimed—in a catalyst having relatively fewer iron oxide ($Fe_2O_3$) particles. The publication explains that such iron oxide particles can reduce the desired net low temperature $NH_3$-SCR catalytic reaction. However, the use of nitrogen to protect the formation of iron oxide species is unsuitable for manufacturing-scale processes. Furthermore, the results in this paper itself (e.g. the Integral UV-Vis signal (a.u.) for the $Fe_2O_3$ particles shown in FIG. 3) show that iron oxide ($Fe_2O_3$) particles are present in the catalysts at Fe loadings above about 0.4 wt. %. So, despite the claims made in the publication, the facts presented by the authors themselves would appear to indicate that the procedure does not avoid a heterogeneous distribution of iron species as the iron loading increases from a relatively low loading and a ratio of an integral UV-Vis signal (arbitrary units (a.u.)) of the iron monomer at about 270 nm to oligomer at about 350 nm at about 1.0 wt. % Fe is <2.

Therefore, alternative processes of obtaining active Fe-loaded small pore zeolites are needed. There is also a need in the art to develop a method of preparing metal-loaded small pore zeolites in general, including iron-containing CHA zeolites such as SSZ-13, that is capable of industrial-scale application. Furthermore, there is also a need in the art to develop Fe-promoted zeolite catalysts that are particularly active as $NH_3$-SCR catalysts and as catalysts for other catalytic applications, such as direct $N_2O$ decomposition, direct oxidation of benzene to phenol. The present invention seeks to meet these needs.

According to a first aspect, the invention provides an iron-loaded aluminosilicate zeolite having a maximum pore opening defined by eight tetrahedral atoms and having the framework type CHA, AEI, AFX, ERI or LTA, wherein the iron (Fe) is present in a range of from about 0.5 to about 5.0 wt. % based on the total weight of the iron-loaded aluminosilicate zeolite, wherein an ultraviolet-visible absorbance spectrum of the iron-loaded aluminosilicate zeolite comprises a band at approximately 280 nm, wherein a ratio of an integral, peak-fitted ultraviolet-visible absorbance signal measured in arbitrary units (a.u.) for the band at approximately 280 nm to an integral, peak-fitted ultraviolet-visible absorbance signal measured in arbitrary units (a.u.) for a band at approximately 340 nm is > about 2. However, preferably the selected framework types are CHA, AEI and AFX, most preferably CHA or AEI.

As is made clear by reference to the art as represented herein by F. Gao et al., ACS Catal. 2016, 6, 2939-2954 discussed hereinabove, the art attributes certain integral, peak-fitted ultraviolet-visible absorbance signal bands measured in arbitrary units (a.u.) to specific iron species, the absorbance signal location reflecting the extra-framework environment in which the iron is understood to be located. It will be appreciated that the integral peak-fitted ultraviolet-visible absorbance signal can vary for different iron-loaded zeolite framework types. However, the framework types claimed are specifically—not arbitrarily—selected because they are structurally similar and so would be expected to exhibit very similar integral peak-fitted ultraviolet-visible absorbance signals for iron-loaded zeolites thereof. For example, the selected framework types include repeating units of d6r (or t-hpr units).

With this understanding, the art has attributed an integral, peak-fitted ultraviolet-visible absorbance spectrum band to the following iron species for zeolites of the claimed framework types: (i) at approximately 280 nm for the iron-loaded synthetic aluminosilicate zeolites of the claimed framework types to isolated octahedrally co-ordinated $Fe^{3+}$ sites; (ii) at approximately 340 nm to oligomeric $Fe^{3+}$ sites; and (iii) at approximately 470 nm to iron oxide ($Fe_2O_3$) particles. See also the under the "Physicochemical Characterisation" section in Example 2 hereinbelow.

Preferably, iron species according to the first aspect of the invention are predominantly present as isolated iron species. "Predominantly" as used herein has its ordinary English meaning of ">50%". The definition "isolated iron species" herein shall mean "not present as $Fe_2O_3$ particles".

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

Furthermore, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The basic and novel characteristics of the first aspect of the present invention are an iron-loaded synthetic aluminosilicate zeolite comprising a ratio of an integral, peak-fitted ultraviolet-visible absorbance signal measured in arbitrary units (a.u.) for a band at approximately 280 nm attributable to isolated octahedrally-coordinated $Fe^{3+}$ sites to a band at approximately 340 nm attributable to oligomeric $Fe^{3+}$ sites is > about 2 and a method of making such iron-loaded synthetic aluminosilicate zeolite. The term "consisting of" closes the claim to the inclusion of materials other than those recited except for impurities ordinarily associated therewith.

US patent publication no. 2017/0267537 A1 discloses a method of producing zeolitic monocrystals, each of which having a pore system comprising at least one micropore system and at least one macropore system, wherein porous oxide particles are converted into the zeolitic material in the presence of an organic template and steam.

US 2008/193358 A1 discloses a method of producing a catalytically active mineral based on a tectosilicate for reducing $NO_x$ to $N_2$ using either hydrocarbon fuel or ammonia, optionally derived from urea, as reducing agent. According to the disclosure, the tectosilicate is preferably a natural zeolite, which is first treated to replace naturally occurring alkali metal and alkaline earth metal counter ions with a metal salt solution before exchanging the treated natural zeolite in the $H^+$ form with a transition metal salt, preferably a copper and/or an iron salt. Chabazite is mentioned as a possible natural zeolite but is preferably a heulandite and most preferably a clinoptilolite. According to the disclosure, the metal salt solution used to replace the naturally occurring counter ions is preferably an ammonium nitrate chloride/ammonium nitrate solution. As natural zeolites have a relatively low silica-to-alumina ratio, even if the ammonium nitrate chloride/ammonium nitrate solution were particularly alkaline, it would not be expected to lead to desilication and the introduction of mesoporosity.

As used herein, the terms "micropore" and "mesopore" use the IUPAC convention mentioned hereinabove. For all pore sizes, the pore diameters can for example be determined by means of imaging techniques, e.g. electron micrographs, or by means of electron beam tomography. The latter is also suitable for determining pore diameters on the inside of crystals. In addition, sorption processes using gases (in particular for the diameters of micro or mesopores) or penetration methods using mercury (in particular for the diameters of the macropores) can be used.

The iron-loaded aluminosilicate zeolites according to the first aspect can be further distinguished by a ratio of integral ultraviolet-visible absorbance signal measured in arbitrary units (a.u.) for the band at approximately 280 nm to an integral ultraviolet-visible absorbance signal measured in arbitrary units (a.u.) for a band at approximately 470 nm is > about 5.

The iron-loaded aluminosilicate zeolites according to the first aspect may preferably have the framework type CHA, AEI or AFX, most preferably CHA (synthetic or natural) or AEI (synthetic only). The aluminosilicate zeolite is preferably a synthetic aluminosilicate zeolite. In a highly preferred embodiment, the aluminosilicate zeolite is synthetic CHA. The natural zeolites of the framework types according to the invention are CHA or ERI, preferably CHA.

The iron present in iron-loaded aluminosilicate zeolite according to the invention, can be in the range of from about 0.27 to about 3.0 wt. % based on the total weight of the iron-loaded aluminosilicate zeolite, such as from about 0.7 to about 3.0 wt. % or about 0.27 to about 1.20 wt. % or about 1.20 to about 3.00 wt. %.

The iron-loaded synthetic aluminosilicate zeolite according to the first aspect of the invention preferably has a silicon-to-aluminium ratio of the underlying aluminosilicate zeolite of from about 5 to about 15 corresponding to a silica-to-alumina ratio of about 10 to about 30.

The Fe/Al atomic ratio of an iron-loaded synthetic aluminosilicate zeolite according to the invention can be from about 0.032 to about 0.75, corresponding to a silicon-to-aluminium ratio of about 5 to about 15 and an iron content of about 0.5 to about 5.0 wt. % based on the total weight of the iron-loaded aluminosilicate zeolite. The Fe/Al atomic ratio of an iron-containing natural aluminosilicate zeolite according to the invention can be from about 0.015 to about 0.28, corresponding to a silicon-to-aluminium ratio of about 2 to about 5 and an iron content of about 0.5 to about 5.0 wt. % based on the total weight of the iron-loaded aluminosilicate zeolite.

Preferably, the iron-loaded synthetic aluminosilicate zeolite according to the invention has a mesopore volume determined by nitrogen physisorption of > about $0.10 \text{ cm}^3/\text{g}$; optionally a total pore volume of > about $0.30 \text{ cm}^3/\text{g}$.

In certain embodiments, the iron-loaded synthetic aluminosilicate zeolite according to invention comprises one or more than one of the transition elements selected from the group consisting of Ce, Cu, Mn, Pd and Pt. For the purposes of this specification, cerium is considered to be a transition metal, i.e. a lanthanoid inner transition element belonging to period 6.

According to a second aspect, the invention provides a washcoat composition comprising an aqueous slurry of an iron-loaded aluminosilicate zeolite according to the first aspect of the invention.

According to a third aspect, the invention provides a honeycomb monolith substrate comprising an iron-loaded aluminosilicate zeolite according to the first aspect of the invention, wherein the honeycomb monolith substrate is coated with a washcoat composition according to the second aspect of the invention or the honeycomb monolith substrate comprises an extrusion of the iron-loaded aluminosilicate zeolite.

According to a fourth aspect, the invention provides an exhaust system comprising an injector for injecting a nitrogenous reductant from a source of nitrogenous reductant into a flowing exhaust gas and a source of nitrogenous reductant, which injector is disposed upstream from a honeycomb monolith substrate according to the third aspect of the invention.

In one embodiment of the exhaust system according to the fourth aspect of the invention, the exhaust system comprises a honeycomb monolith substrate comprising an oxidation catalyst for oxidising nitrogen monoxide in an exhaust gas flowing in the system to nitrogen dioxide, which honeycomb monolith substrate comprising the oxidation catalyst is disposed upstream of the honeycomb monolith substrate comprising the iron-loaded synthetic aluminosilicate zeolite.

According to a fifth aspect, the invention provides the use of an iron-loaded aluminosilicate zeolite according to the first aspect of the invention for selectively reducing oxides of nitrogen in an exhaust gas to dinitrogen using a nitrogenous reducing agent.

According to a sixth aspect, the invention provides a method of making a metal-loaded aluminosilicate zeolite having a maximum pore opening defined by eight tetrahedral atoms from pre-existing aluminosilicate zeolite crystallites, wherein the metal is present in a range of from 0.5 to 5.0 wt. % based on the total weight of the metal-loaded aluminosilicate zeolite, which method comprising the steps of:
  (i) introducing mesoporosity into the aluminosilicate zeolite crystallites by application of an aqueous alkali treatment to dissolve silica or application of an aqueous acidic treatment to dissolve alumina in the aluminosilicate zeolite crystallites;
  (ii) introducing the metal into the product of step (i) by wet impregnation or wet ion-exchange by contacting the product of step (i) with a mixture of a metal reagent and a structure directing agent for the aluminosilicate zeolite; and
  (iii) performing hydrothermal crystallisation on the product of step (ii).

Preferably, the pre-formed aluminosilicate zeolite crystallites to be treated are crystallites of a synthetic zeolite, for example a synthetic aluminosilicate zeolite having the framework type CHA, AEI, AFX, ERI or LTA. Alternatively, the pre-formed aluminosilicate zeolite crystallites to be treated are crystallites of a natural aluminosilicate zeolite, for example a natural zeolite having the framework type CHA or ERI.

The metal-loaded aluminosilicate zeolite may be a transition metal-loaded aluminosilicate zeolite, especially an iron-loaded aluminosilicate zeolite, having the framework type CHA, AEI, AFX, ERI or LTA.

In a preferred embodiment of the sixth aspect, the invention provides a method of making an iron-loaded synthetic aluminosilicate zeolite having a maximum pore opening defined by eight tetrahedral atoms from pre-existing synthetic aluminosilicate zeolite crystallites and having the framework type CHA, AEI, AFX, ERI or LTA, wherein the iron (Fe) is present in a range of from 0.5 to 5.0 wt. % based on the total weight of the iron-loaded synthetic aluminosilicate zeolite, which method comprising the steps of:
  (i) introducing mesoporosity into the synthetic aluminosilicate zeolite crystallites by application of an aqueous alkali treatment to dissolve silica in the aluminosilicate zeolite crystallites;
  (ii) introducing iron into the product of step (i) by wet impregnation or wet ion-exchange by contacting the product of step (i) with a mixture of an iron reagent and a structure directing agent for the aluminosilicate zeolite; and
  (iii) performing hydrothermal crystallisation on the product of step (ii).

In step (iii) of the method of the sixth aspect, silica and/or alumina dissolved in step (i) may be reassembled around the metal-(e.g. iron-) impregnated mesoporous synthetic aluminosilicate crystallites produced in step (ii) to form the metal-loaded (e.g. iron-loaded) synthetic aluminosilicate zeolite.

Preferably, the aluminosilicate zeolite crystallites used in step (i) and/or the product of (iii) has an alkali content of the zeolite of less than about 1 weight percent more preferably less than about 0.5 weight percent, which can improve catalyst durability and overall NOx conversion in use as a SCR catalyst. As used herein, alkali content is expressed on a wt % basis in terms of the respective oxides for sodium, calcium and potassium present as cations in the zeolite.

The invention according to the sixth aspect of the present invention can be performed in "one-pot" or in a series of steps where material is recovered from one or more of steps (i) and/or (ii) before proceeding to the next step. However, in one embodiment, the method according to the sixth aspect of the invention comprises the steps of (i') recovering and calcining the product of step (i); (ii') recovering and drying the product of step (ii); and (iii') recovering and calcining the product of step (iii).

The hydrothermal crystallisation step (iii) may comprise steam-assisted crystallisation. The steam-assisted crystallisation step (iii) can, for example, be carried out by introducing the product of step (ii) or (ii') into an autoclave containing water which, upon heating, at least partially enters the vapour phase. The material to be converted should not come into contact with liquid water. Additional pressurization is not necessary. Alternatively, the mixture provided in step (ii) can also be converted under atmospheric pressure in the presence of moist air in step (iii), e.g. in a climatic chamber or an oven.

The step (iii) temperature is typically between 50° C. and 250° C., preferably between 80° C. and 160° C. and especially preferred between 90° C. and 130° C. The duration of the step (iii) synthesis is usually between 12 h (hours) and 10 d (days), however, preferably between 1 day and 5 days, and especially preferred between 2 days and 4 days.

After completion of the conversion in step (iii), the reaction mixture is left to cool. The product can then be subjected to common aftertreatment steps such as washing. However, one of the advantages of the method according to the present invention is the fact that the resulting product is already macroporous after synthesis so that the aftertreatment steps common after synthesis in other methods to remove the macro template can be omitted.

Separation techniques include centrifugation e.g. 10,000 rpm, washing e.g. 3× in distilled water.

The following Table provides a non-limiting list of common organic molecules for use as templates and the corresponding resulting zeolitic frameworks. The terms "structure directing agent" and "template" are used synonymously throughout this specification.

| Zeolite framework | Suitable structure directing agents |
|---|---|
| CHA | 1-adamantamine, 3-quinuclidinol or 2-exo-aminonorbornane and the quaternary lower |

-continued

| Zeolite framework | Suitable structure directing agents |
|---|---|
|  | alkylammonium cation derivatives thereof, preferably N,N,N-trimethyl-1-adamantanammonium hydroxide (TMAdOH); benzyltrimethylammonium hydroxide (BTMAOH); tetraethylammonium hydroxide (TEAOH); choline chloride; N,N-dimethylpiperidine hydroxide; trimethylcyclohexylammonium hydroxide; and N-alkyl-1,4-diazabicycle octane cations |
| AEI | N-N-dimethyl-3,5-dimethylpiperidinium cation; tetraethylphosphonium (TEP) cations; 1,1,3,5-tetramethylpiperidinium cation; 1,1-diethyl-2,6-dimethylpiperidinium cation; 1,1,2,6-tetramethylpiperidinium cation, 1-ethyl-1,2,6-trimethylpiperidinium cation; and 1,1,2-triethylpiperidinium cation. |
| AFX | 1,4-di(l-azoniabicyclo[2.2.2]octane) lower alkane cations; 1,4-diazabicyclo[2.2.2]octane-d-diquat cations; 1,3-bis(l-adamantyl)imidazolium cations; 1,1'-(1,4-cyclohexylenedimethylene)bis[l-methylpiperidinium]; 1,1'-(1,4-cyclohexylenedimethylene)bis[l-ethylpiperidinium]; 1,1'-(1,4-cyclohexylenedimethylene)bis[l-methylpyrrolidinium]; and 1,1'-(1,4-cyclohexylenedimethylene)bis[l-ethylpyrrolidinium]; and Et6-diquat-5 $Br_2$ |
| ERI | None required |
| LTA | Tetraethylammonium (TEA(+)); tetramethylammonium (TMA(+)); 1-butyl-3-methylimidazolium cations |

A preferable structure directing agent for use in connection with the method directed to synthetic or natural aluminosilicate CHA zeolites is TMAdOH.

Alkali treatment is preferably used for embodiments using synthetic zeolites, which general have higher silicon-to-aluminium ratios than natural zeolites. For relatively low silicon-to-aluminium ratio natural zeolites, it is preferable to introduce mesoporosity by dissolving aluminium using acid treatment, such as oxalic acid, instead of alkali treatment. Where step (i) according to the method of the sixth aspect of the invention uses an alkali treatment to dissolve silica, preferably the method further includes adding a surfactant to an aqueous system of step (i).

Typical surfactants with application according to the sixth aspect of the present invention include cationic, anionic or non-ionic surfactants. Cationic surfactants that can be used include Cetyl Trimethyl Ammonium Bromide (CTAB) also known as hexadecyltrimethylyammonium bromide, a quaternary ammonium surfactant; dodecyltrimethylammonium bromide (DTAB); and tetradecyltrimethylammonium bromide (TTAB). Anionic surfactants with application in the seventh aspect of the present invention include sodium dodecyl sulfate (SDS), sodium lauryl sulfate (SLS), sodium pareth sulfate (SPS) or sodium laureth sulfate (SLES). Non-ionic surfactants include Tween 60™.

Cationic surfactants may be preferable for use where alkali pH solutions are used in step (i). Preferably, the surfactant is a cationic surfactant and is most preferably cetyltrimethylammonium bromide (CTAB).

The metal reagent can be any suitable metal reagent. For example, where the metal to be loaded is iron, the iron-reagent may be aqueous iron nitrate.

According to a seventh aspect, there is provided an iron-loaded synthetic aluminosilicate zeolite optionally according to the first aspect of the present invention, obtained by or obtainable by the method according to the sixth aspect of the invention.

The properties of the material according to the present invention can optionally be optimized for specific applications by means of common post-synthetic modifications such as demetallization, ion exchange or thermal treatment known to the person skilled in the art.

In order that the invention may be more fully understood, reference is made to the following Examples by way of illustration only and with reference to the accompanying drawings, wherein.

Figure 1:
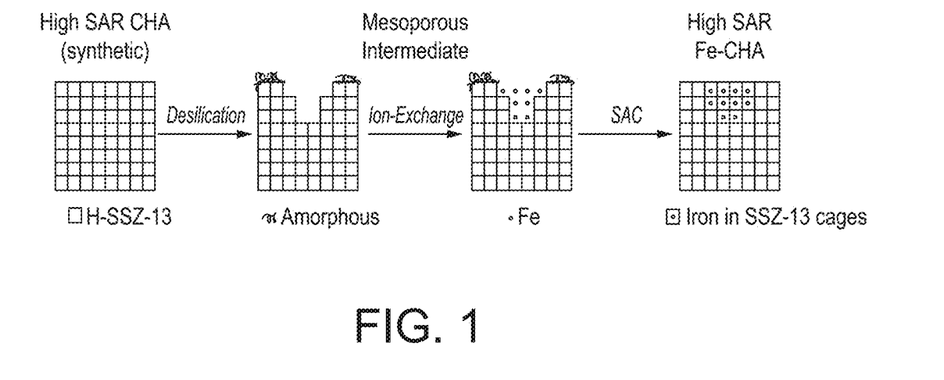
FIG. 1 is a schematic diagram showing the procedure for a synthetic aluminosilicate CHA embodiment according to the invention performed on SSZ-13.

Herein we report a method for the synthesis of Fe-SSZ-13 by post-synthesis treatment methods which has been systematically described in the scheme of FIG. 1. First SSZ-13 zeolite is desilicated to generate mesopores and the dissolved silica is reassembled around micelles. Upon pH reduction, the mesoporous silica is deposited on the external surface of mesoporous SSZ-13 zeolite. The resultant mesoporous SSZ-13 zeolite exhibits very high mesoporosity. Thus, the accessibility of the iron species to the inside of SSZ-13 crystals is enhanced and homogeneous distribution of iron ions can be obtained in SSZ-13 crystals. The mesoporous SSZ-13 is then impregnated with iron nitrate and structure directing agent (TMAdOH) solution and then dried. Finely grounded powder was crystallised in the presence of steam.

EXAMPLES

Example 1—Preparation of Fe-CHA Catalyst from Synthetic Aluminosilicate SSZ-13

A commercially available SSZ-13 zeolite (H-form) with a nominal $SiO_2/Al_2O_3$ ratio (SAR) of 22 was used in the course of these Examples. The as-received sample was labelled as H_CHA22. The Si/Al ratio of the H_CHA22 sample measured by ICP-OES (using inductively couple plasma optical emission spectroscopy) was 11.4, i.e. a silica-to-alumina ratio of 22.8.

Preparation of Mesoporous SSZ-13 Zeolite

A mesoporous SSZ-13 zeolite prepared by a desilication-reassembly method was made as follows. 45 ml of 0.2 M NaOH solution was used to treat 1.0 g of zeolite powder under stirring condition. The treatment was carried out at 65° C. for 1 hour. 0.7 g of Cetyl Trimethyl Ammonium Bromide (CTAB) was dissolved in 45 ml water and added to the above mixture. The pH of the mixture was adjusted to 9 using 1 M HCl and then the mixture was hydrothermally treated at 100° C. for 24 hours under static conditions. The product was then recovered by filtration, washed with distilled water and subsequently dried at 70° C. for 24 hours. Finally, the product was calcined at 550° C. in the presence of air for 8 hours. The mesoporous sample is labelled as CHA22_DR.

Wet Ion Exchange of Microporous and Mesoporous SSZ-13

1 g of microporous SSZ-13 (H_CHA22) was ion exchanged with 18 ml of 0.01M $Fe(NO_3)_3.9H_2O$ at room temperature for 24 hours. The excess water was evaporated and dried in an oven at 60° C. The product was filtered, washed, dried in an oven at 70° C. for 24 hours and calcined at 550° C. in the presence of synthetic air. This sample was labelled as CHA22_Fe1.

The mesoporous SSZ-13 prepared as described hereinabove was first converted into its H-form. Typically, 1 g of sodium form zeolite powder was ion exchanged two times with 25 ml of 0.2 M $NH_4NO_3$ at room temperature under stirring condition for 24 hours. The ion-exchanged powder was filtered, washed and dried at 70° C. overnight. Subsequently, the post modified sample was calcined in air at 550° C. for 5 hours. Wet ion exchange of sample CHA22_DR (H-form) was performed in a similar manner to that described for the microporous SSZ-13 (CHA22_Fe1). The iron containing mesoporous SSZ-13 prepared by wet ion-exchange was labelled as CHA22_DR_Fe1.

Steam Assisted Crystallisation

Mesoporous SSZ-13 (CHA22_DR) was mixed with an aqueous solution of iron nitrate, water, structure directing agent (TMAdOH) and sodium hydroxide so that the final composition had the composition $1SiO_2:0.05Al_2O_3:0.007Fe_2O_3:0.07Na_2O:0.1TMAdOH:45H_2O$. The mixture was stirred for 30 minutes at room temperature. Thereafter, the excess water was evaporated and dried at 60° C. in an oven. The dried powder was finely ground in a mortar using a pestle and the resulting ground powder was poured into a PTFE crucible. Water was added into the liner and the crucible was mounted in the liner. Steam assisted crystallisation was performed at 190° C. for 48 hours. The product was filtered, washed with distilled water and dried in an oven at 70° C. for 24 hours. Finally, the product was calcined in air at 550° C. for 8 hours. To convert the sodium form sample into H-form, 1 g of sodium form zeolite powder was ion-exchanged two times with 25 ml of 0.2 M $NH_4NO_3$ at room temperature under stirring condition for 24 hours. The ion-exchanged powder was filtered, washed and dried at 70° C. overnight. Subsequently the post-modified sample was calcined in air at 550° C. for 5 hours. The resulting product was labelled as CHA22_DR_Fe1_SAC and had a white colour.

Example 2—Catalyst Characterization

All post-synthesised samples were characterised by XRD (X-Ray diffraction), $N_2$-physisorption, $NH_3$-TPD (temperature programmed desorption of ammonia), ICP-OES (Inductive coupled plasma-optical emission spectroscopy), SEM (Scanning electron microscopy), $^{29}Si$ and $^{27}Al$ MAS NMR (Magic-angle spinning nuclear magnetic spectroscopy) and UV-Vis spectroscopy.

XRD of samples was performed using $CuK_\alpha$ radiation on X'Pert Pro diffractometer (Philips Analytical). A diffraction pattern was collected in the 2θ of 2-50° region. The parent sample (H_CHA22) was used as a standard to calculate the relative crystallinity of the post modified samples.

$N_2$-physisorption at 77 Kelvin was performed in a Quadrasorb™ SI gas adsorption analyser for the surface area analysis and pore size analysis. Prior to analysis, the samples were pre-treated for 12 hours at 300° C. under vacuum.

For $NH_3$-TPD, the ammonia uptake of all samples was measured using TPDRO 1100 Thermo electron cooperation. Each sample was placed between layers of quartz wool in a glass tube and then pre-treated in the helium flow at 550° C. for 30 minutes with a ramp-rate of 10° C./min. The saturation of each zeolite sample with gaseous ammonia was carried out at 120° C. for 30 minutes. Finally, the ammonia was removed in the helium flow at 600° C. for 60 minutes with a ramp-rate of 10° C./min. The gas exiting the glass tube was analysed using a thermal conductivity detector (TCD).

SEM analysis was performed using a Carl Zeiss ULTRA 55 microscope at a voltage of 3 kV without any sample pre-treatment.

Solid state NMR analyses were performed at 11.74 T on an Agilent DD2 500 MHz WB spectrometer equipped with a commercial 3.2 mm triple resonance MAS probe at a $^{29}Si$ and $^{27}Al$ frequency of 99.362 MHz and 130.318 MHz, respectively. $^{29}Si$ direct excitation experiments of were acquired using a 90° pulse length of 3.0 μs, recycle delay of 60 seconds and at a sample spinning frequency of 10 kHz. Similarly, $^{27}Al$ magic-angle spinning (MAS) NMR spectra were obtained using direct excitation at a spin speed 15 kHz with a pulse length of 1.25 μs and a recycle delay of 1.0 seconds. $^{29}Si$ and $^{27}Al$ MAS experiments were performed with a total number of scans (NS) of 128 and 4000, respectively. $^{27}Al$ chemical shifts were reported with respect to a solution of $AlCl_3$ adjusted to a pH of 1 with HCl (delta_iso=0 ppm). Similarly, the Chemical Shifts of $^{29}Si$ were reported using delta scale and are referenced to tetramethylsilane (TMS) at 0 ppm.

UV-vis spectra were recorded on a Jasco V650 High resolution UV-Vis spectrometer equipped with Harrick Praying Mantis™ Diffuse Reflection accessory and $BaSO_4$ was used as a reference sample.

Physicochemical Characterisation

Figure 2:
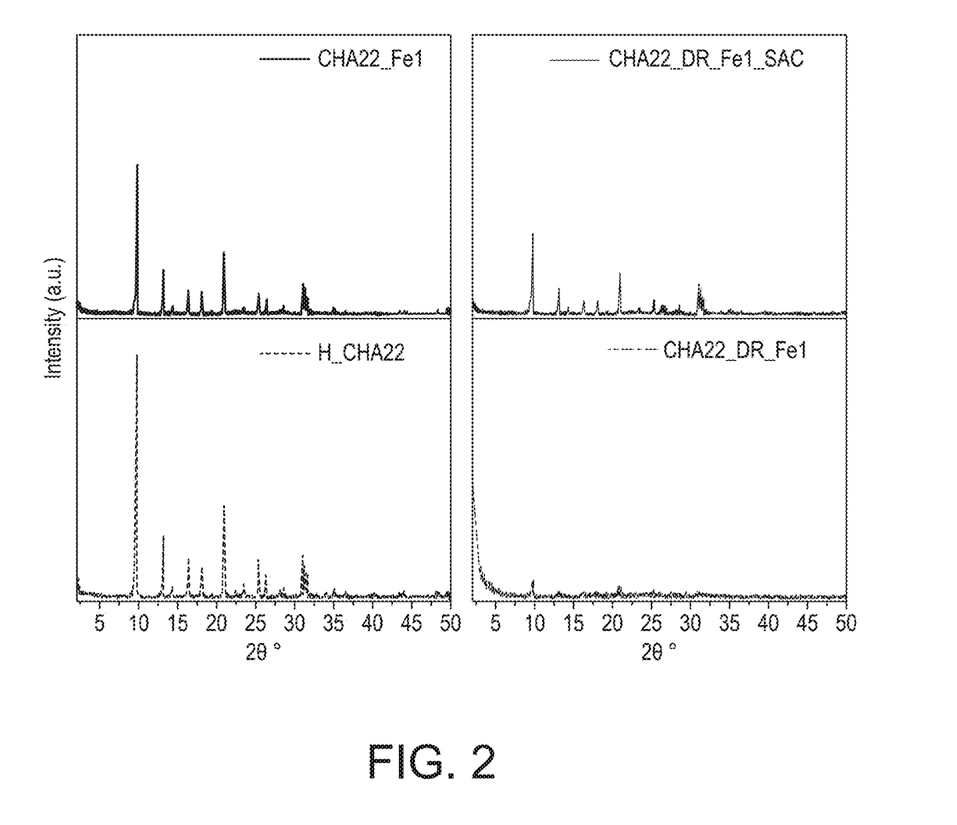
FIG. 2 shows a comparison of the powder XRD pattern of the parent SSZ-13 and post-synthesis modified materials at various steps of the procedure set out schematically in FIG. 1.

FIG. 2 shows the powder XRD pattern of the parent SSZ-13 (H_CHA22), iron containing samples prepared by wet ion-exchange of microporous SSZ-13 (CHA22_Fe1), iron-loaded sample prepared by wet ion exchange of mesoporous SSZ-13 (CHA22_DR_Fe1) and iron-loaded sample prepared by steam-assisted crystallisation of the iron-loaded mesoporous SSZ-13 (CHA22_DR_Fe1_SAC). The corresponding relative crystallinity of the ratio of the integral intensities of X-ray peaks in 2θ°=13.1, 16.3, 18.1, 20.9, 25.4, 26.3, 31.1, and 31.6 are listed in Table 1.

TABLE 1

Relative crystallinity, chemical composition and acidic properties of the parent and post treated zeolites

| Samples | Relative crystallinity (%)[a] | Si/Al[b] | Fe (wt. %) | Total acidity μmol-$(NH_3/g_{cat})$[c] |
|---|---|---|---|---|
| H_CHA 22 | 100 | 11.4 | 0.0 | 1110 |
| CHA22_DR | 11 | 9.7 | 0.0 | No data |

TABLE 1-continued

Relative crystallinity, chemical composition and acidic properties of the parent and post treated zeolites

| Samples | Relative crystallinity (%)[a] | Si/Al[b] | Fe (wt. %) | Total acidity μmol-(NH$_3$/g$_{cat}$)[c] |
|---|---|---|---|---|
| CHA_22 Fe1 | 71 | 11.1 | 0.75 | 1011 |
| CHA22_DR_Fe1 | 13 | 11.6 | 1.1 | 658 |
| CHA22_DR_Fe1_SAC | 59 | 11.5 | 0.97 | 1030 |

[a]Relative crystallinity calculated from the ratio of intensities of X-ray peaks in 2θ° = 13.1, 16.3, 18.1, 20.9, 25.4, 26.3, 31.1, and 31.6 region;
[b]Inductively coupled plasma-optical emission spectroscopy (ICP-OES); and
[c]Calculated from high temperature peak of the ammonia temperature programmed desorption (NH$_3$-TPD).

XRD analysis indicates that the parent sample (H_CHA22) has Chabazite (CHA)-type structure without any other crystalline phase. After ion exchange of sample H_CHA22 with iron nitrate solution, the peak intensities characteristic of CHA reflections decreased, possibly due to the higher X-rays absorption coefficient of iron species. The introduction of mesopores and addition of iron in mesoporous SSZ-13 (CHA22_DR_Fe1) leads to interruption in the long range periodic arrangement of crystalline structure and thus results in the reduction of peak intensities.

The sample prepared by steam assisted crystallisation of the iron-loaded mesoporous SSZ-13 exhibits high characteristic peak intensity, which implies that the iron-loaded mesoporous SSZ-13 has been successfully recrystallized.

Figure 3:
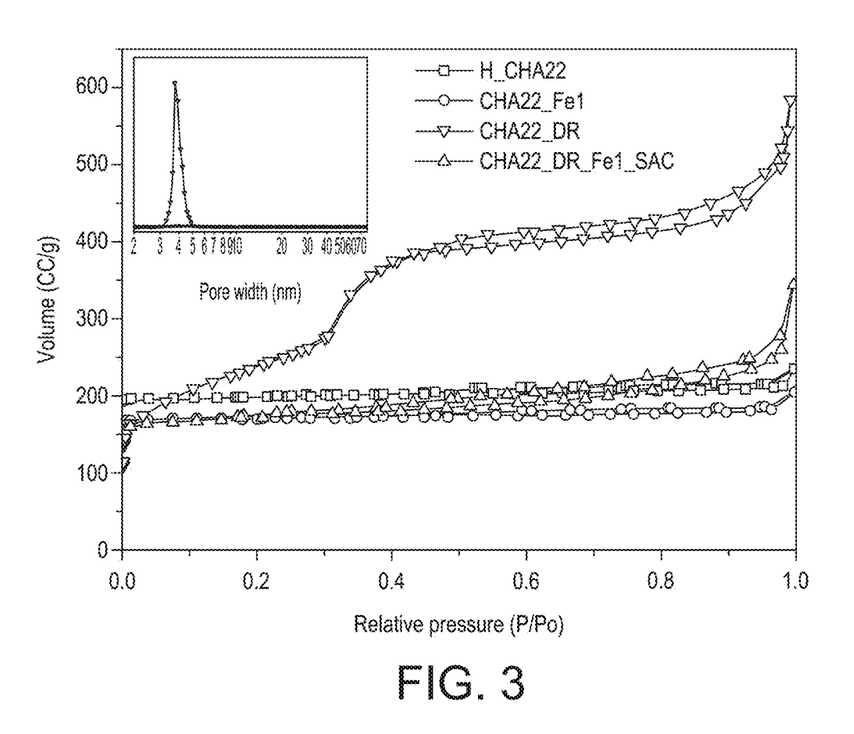
FIG. 3 shows nitrogen physisorption analysis of the parent SSZ-13 and post-synthesis modified SSZ-13 zeolites according to the Examples.

Nitrogen adsorption-desorption isotherms of the parent sample (H_CHA22), iron-loaded sample prepared by wet ion exchange of microporous SSZ-13 (CHA22_Fe1), mesoporous SSZ-13 (CHA22_DR) and the sample prepared by steam-assisted crystallisation of iron-loaded mesoporous SSZ-13 (CHA22_DR_Fe1_SAC) are presented in FIG. 3 and the corresponding values are listed in Table 2.

| Samples | S$_{BET}$ (m$^2$/g) | V$_{Total}$ (cm$^3$/g)[a] | V$_{micro}$ (cm$^3$/g)[b] | V$_{meso}$ (cm$^3$/g)[c] |
|---|---|---|---|---|
| H_CHA 22 | 667 | 0.36 | 0.30 | 0.06 |
| CHA22_DR | 576 | 0.31 | 0.26 | 0.05 |
| CHA_22 Fe1 | 851 | 0.90 | 0.05 | 0.85 |
| CHA22_DR_Fe1 | 529 | 0.61 | 0.03 | 0.58 |
| CHA22_DR_Fe1_SAC | 521 | 0.40 | 0.23 | 0.17 |

[a]V$_{Total}$: Total pore volume @ P/P$_o$ = 0.99;
[b]t-plot;
[c]V$_{meso}$ = V$_{Total}$ − V$_{micro}$; and V$_{meso}$: Mesopore volume, V$_{micro}$: Micropore volume The nitrogen adsorption isotherm of H_CHA22 follows the IUPAC Type 1 isotherm and implies that the sample has a microporous nature. The pore size distribution of sample H_CHA22 shows that the presence of mesopores is negligible. Addition of iron in sample H_CHA22 results in less BET surface area and micropore volume.

Sample CHA22_DR has high nitrogen uptake in the range of P/Po=0.3-0.45, which indicates the presence of ordered mesopores and can be seen in pore size distribution (FIG. 3 inset). The nitrogen adsorption-desorption isotherm of sample CHA22_DR_Fe1_SAC has high nitrogen uptake at low P/Po and a plateau with increasing P/Po, which indicates that the mesopores which were created by desilication-reassembly are closed after the steam-assisted crystallisation.

The elemental analysis and the acidity measurement of the parent and post-treated samples are given in Table 1. ICP analysis showed that the Si/Al ratio of the mesoporous samples prepared by the desilication-reassembly approach (CHA22_DR) is similar to the parent sample (H_CHA22). The sample prepared by steam-assisted crystallisation of the iron containing mesoporous SSZ-13 zeolite is also similar to the parent sample, which indicates that little or no material is lost during the steam-assisted crystallisation. The iron contents of samples CHA22_Fe1, CHA22_DR_Fe1 and CHA22_DR_Fe1_SAC are 0.75, 1.1 and 0.97 wt. % respectively.

Figure 4:
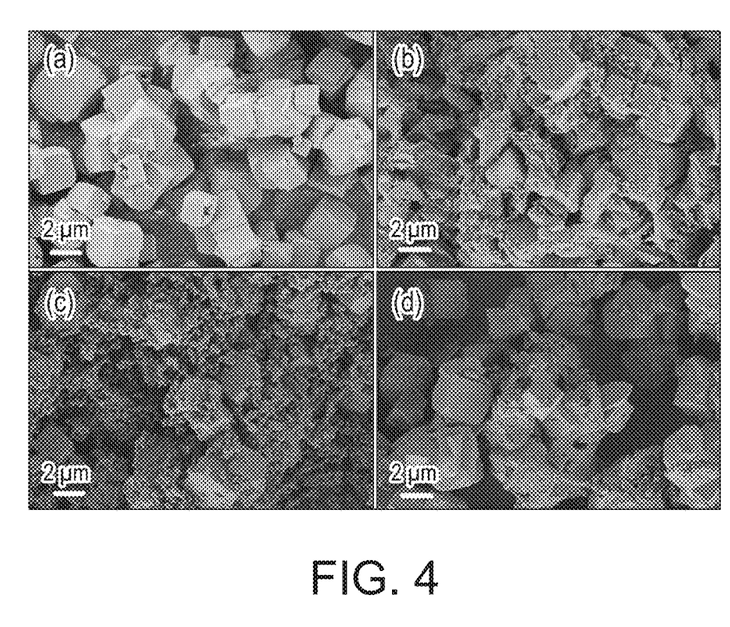
FIG. 4 shows a series of SEM images of (a) H_CHA22, (b) CHA22_DR, (c) CHA22_DR_Fe1, and (d) CHA22_DR_Fe1_SAC materials according to the Examples.

The SEM image analysis shows that the parent sample (H_CHA22) exhibits cube like intergrown morphology of the chabazite (CHA) that appears to have a smooth surface (see FIG. 4a). The amorphous silica can be observed on the external surface of the mesoporous SSZ-13 and iron-loaded mesoporous SSZ-13 zeolites (see FIGS. 4b and 4c respectively). After steam-assisted crystallisation, the amorphous silica fragments are diminished (see FIG. 4d). However there exist some crystals having a rough surface relative to the parent sample (H_CHA22). Nitrogen sorption analysis shows that sample CHA22_DR_Fe1_SAC does not have any intercrystal porosity.

The $^{29}$Si MAS NMR values corresponding to the spectra (not shown) of samples H_CHA22, CHA22_DR and CHA22_DR_Fe1_SAC are listed in Table 2 hereinabove. The parent sample (H_CHA22) has two clear peaks at σ=−116 ppm and −110 ppm, which are typically assigned to Q4(0Al) and Q4(1Al). A sharp peak at σ=−116 ppm indicates that 67% silicon atoms are present as Si(SiO)$_4$ groups, and a less intense peak at σ=−110 ppm indicates that 33% silicon atoms are present as AlOSi(SiO)$_3$ groups. A very weak signal at σ=−104 ppm might indicate some defects and is ignored during quantification. Sample CHA22_DR shows three moderate peaks at σ=−116, 110 and 104 ppm which reveal that the Si(SiO)$_4$ groups are decreased from 67 to 42% and structural defects possibly caused by the desilication-reassembly process. These structural defects were annealed by subsequent steam-assisted crystallisation.

$^{29}$Al MAS NMR spectra (not shown) of samples H_CHA22, CHA22_DR and CHA22_DR_Fe1_SAC reveal resonance at σ=0 ppm, 30 ppm and 58 ppm, which indicate octahedrally-, pentahedrally-, and tetrahedrally-coordinated aluminium respectively. The parent sample (H_CHA22) shows a sharp peak at 58 ppm, and a small peak at 0 ppm, which indicates that aluminium is predominantly present as framework (81%), gives rise to Si—(OH)—Al bridges and results in high ammonia uptake. The 27Al MAS NMR spectra of mesoporous SSZ-13 zeolite (CHA22_DR) contains an intense peak at 58 ppm (tetrahedrally-coordinated aluminium), which is accompanied by a shoulder that stretches to 30 ppm and indicates the presence of pentahedrally-coordinated aluminium. Octahedrally-coordinated aluminium (σ=0 ppm) is also accompanied by a weak shoulder at 10 ppm, which disappears after steam-assisted crystallisation. Furthermore, sample CHA22_DR_Fe1_SAC has a narrow peak at σ=60 ppm compared to sample CHA22_DR.

Figure 5:
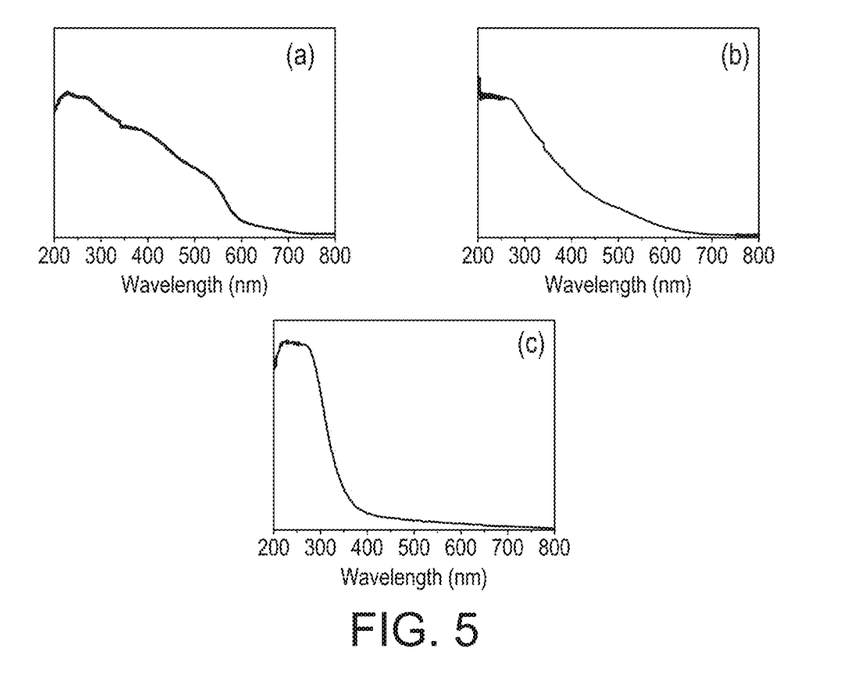
FIG. 5 shows UV-Vis spectra of (a) CHA22_Fe1, (b) CHA22_DR_Fe1, and (c) CHA22_DR_Fe1_SAC.

UV-vis spectroscopy was used to investigate the coordination state and extent of aggregation of iron species. The UV-vis spectra of samples CHA22_Fe1, CHA22_DR_Fe1, and CHA22_DR_Fe1_SAC are shown in FIG. 5. The UV-vis spectrum of sample CHA22_Fe1 (which was prepared by wet ion exchange of microporous SSZ-13 zeolite) is stretched from 200 to 600 nm, which indicates various d-d transitions and thus that the sample contains the various types of iron sites. Three narrow and strong bands can be observed at low wavelength: narrow band which is centred at 220 nm indicates isolated tetrahedrally-coordinated $Fe^{3+}$ sites; a narrow band centred at 280 nm indicates isolated octahedrally-coordinated $Fe^{3+}$ sites; and a narrow band at 340 nm can be assigned to oligomeric $Fe^{3+}$ sites. This sample was prepared by simple wet ion exchange of microporous SSZ-13 zeolite and additionally shows two broad bands at 427 and 540 nm, which can be assigned to larger iron oxide particles ($Fe_2O_3$-like aggregates).

The Sample CHA22_DR_Fe1 has clear bands at 280 and 340 nm, which are indicators of isolated octahedrally-coordinated and oligomeric $Fe^{3+}$ sites, respectively. However, the low wavelength band from 200-220 nm is not clear, probably because this sample was prepared by wet ion exchange of mesoporous SSZ-13 (CHA22_DR), which has very low microporosity (0.05 cm³/g). The two bands at 427 and 540 nm, for the larger iron oxide particles, are much weaker than the corresponding bands in sample CHA22_Fe1, which suggests that the iron ions supported in mesoporous SSZ-13 (CHA22_DR_Fe1) were less oxidised during calcination. Without wishing to be bound by theory, the inventors speculate that a reason for this observation may be because, in the CHA22_Fe1 sample, a significant fraction of iron ions could not diffuse into the micropores of SSZ-13, and thus were more likely to be oxidised during calcination.

The UV-vis band of sample CHA22_DR_Fe1_SAC extends from 200 to 500 nm and shows strong, defined peaks at 220 and 280 nm, which indicate isolated tetrahedrally-/ and octahedrally-coordinated $Fe^{3+}$ sites and are difficult to discriminate therebetween. Moreover, this sample has a weak band at 340 nm and so a relatively small quantity of oligomeric $Fe^{3+}$ sites. A very weak signal at 470 nm implies that sample CHA22_DR_Fe1_SAC contains negligible iron oxide particles.

Example 3—Catalytic Activity Measurement

The $NH_3$-SCR catalytic activity of each sample was measured in a fixed bed quartz reactor. The composition of the reactant gas mixture used was 550 ppm $NH_3$, 500 ppm NO, 8% $O_2$, 10% $H_2O$ with a balance of nitrogen. The total gas flow rate was 840 ml/h or 1000 L/g·h WHSV (weight hourly space velocity) and a sample mass of 50 mg was used. Prior to collecting reaction measurements, all samples were pre-treated at 550° C. in air for 30 min. The gas composition was measured using a Varain FT-IR equipped with gas cell (Gemini MARS) having a 4 m path length. The catalytic activity was measured from 325° C. to 500° C. with an interval of 25° C. and a waiting (or "soak") time of 45 minutes at each temperature.

Figure 6:
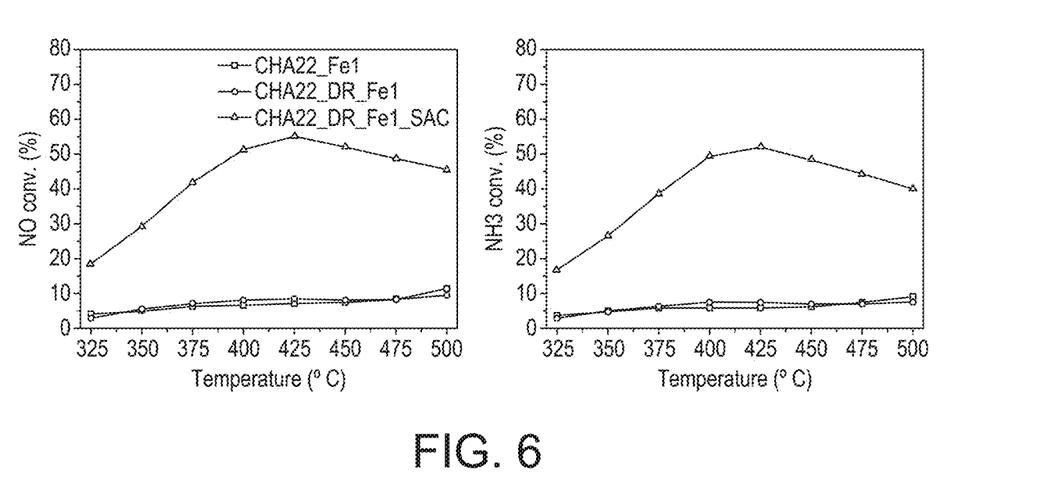
FIG. 6 shows the $NH_3$-selective catalytic reduction (SCR) catalytic performance of CHA22_Fe1, CHA22_DR_Fe1 and CHA22_DR_Fe1_SAC.

The catalytic activity of the CHA22_Fe1, CHA22_DR_Fe1 and CHA22_DR_Fe1_SAC samples were tested and the results are presented in FIG. 6. Samples CHA22_Fe1 and CHA22_DR_Fe1, have very low NO and $NH_3$ conversion. These samples were prepared by wet ion exchange of microporous SSZ-13 and mesoporous SSZ-13 respectively with iron nitrate solution. It can be seen from the results shown in Table 1 that sample CHA22_Fe1 has relatively high crystallinity and micropore volume, and the UV-vis data (not shown) indicates that some iron is present as isolated tetrahedrally-coordinated or octahedrally-coordinated sites and oligomeric $Fe^{3+}$ sites together with a significant amount of iron oxide aggregate particles. These iron oxide aggregates do not appear to be active for the $NH_3$-SCR reaction and so this sample has a relatively low NO conversion.

Iron-loaded mesoporous SSZ-13 (CHA22_DR_Fe1) also exhibits relatively low NO conversion, although it contains a relatively high wt. % quantity of iron. This relatively low NO conversion is presumably due to the loss of crystalline structure during the desilication-reassembly process and thus can be observed in the XRD and nitrogen physisorption results (see FIGS. 2 and 3 and under the "Physicochemical Characterisation" heading of Example 2).

Sample CHA22_DR_Fe1_SAC exhibits good, relatively high NO conversion compared to the other two samples which we attribute to the presence of iron sites in SSZ-13 cages as isolated tetrahedrally-coordinated and octahedrally-coordinated and comparatively fewer oligomeric $Fe^{3+}$ sites.

The foregoing detailed description has been provided by way of explanation and illustration and is not intended to limit the scope of the appended claims. Many variations in the presently preferred embodiments illustrated herein will be apparent to one of ordinary skill in the art and remain within the scope of the appended claims and their equivalents.

For the avoidance of doubt, the entire contents of all documents acknowledged herein are incorporated herein by reference.

The invention claimed is:

1. A method of making a metal-loaded aluminosilicate zeolite having a maximum pore opening defined by eight tetrahedral atoms, wherein the metal is present in a range of from about 0.5 to about 5.0 wt. % based on the total weight of the metal-loaded aluminosilicate zeolite, by treatment of pre-formed crystallites of an aluminosilicate zeolite, which method comprises the steps of:
   (i) introducing mesoporosity into the pre-formed aluminosilicate zeolite crystallites by application of an aqueous alkali treatment to dissolve silica or application of an aqueous acidic treatment to dissolve alumina in the aluminosilicate zeolite crystallites;
   (ii) introducing the metal into the product of step (i) by wet impregnation or wet ion-exchange by contacting the product of step (i) with a mixture of a metal reagent and a structure directing agent for the metal-loaded aluminosilicate zeolite; and
   (iii) performing hydrothermal crystallisation on the product of step (ii).

2. The method according to claim 1 wherein the metal is a transition metal.

3. The method according to claim 2 wherein the metal is iron.

4. The method according to claim 1 wherein the hydrothermal crystallisation of step (iii) is steam assisted crystallisation.

5. The method according claim 1 wherein the pre-formed aluminosilicate zeolite crystallites to be treated are crystallites of a synthetic aluminosilicate zeolite.

6. The method according to claim 5 wherein the metal-loaded aluminosilicate has the framework type CHA, AEI, AFX, ERI or LTA.

7. The method according to claim 5 wherein step (i) uses an aqueous alkali treatment to dissolve silica and wherein silica dissolved in step (i) is reassembled around the product of step (ii).

8. The method according to claim 7, wherein a surfactant is added the aqueous system of step (i).

9. The method according to claim 8, wherein the surfactant is a cationic surfactant.

10. The method according to claim 1 wherein the preformed aluminosilicate zeolite crystallites to be treated are crystallites of a natural aluminosilicate zeolite.

11. The method according to claim 10 wherein the metal-loaded aluminosilicate has the framework type CHA or ERI.

12. The method according to claim 10 wherein step (i) uses an aqueous acidic treatment to dissolve alumina.

13. The method according claim 1, comprising the steps (i') recovering and calcining the product of step (i); (ii') recovering and drying the product of step (ii); and (iii') recovering and calcining the product of step (iii).

14. The method according to claim 2, wherein the metal reagent is aqueous iron nitrate.

15. The method according to claim 2, wherein the metal-loaded aluminosilicate zeolite has the framework type CHA and the structure directing agent is N,N,N-trimethyl-1-adamantanammonium hydroxide (TMAdOH).

* * * * *